Feb. 11, 1969 F. M. RONCI Re. 26,524

PULL TAB CAN OPENER

Original Filed Dec. 4, 1963

INVENTOR.
FERNANDO M. RONCI
BY
Max Schwartz
ATTORNEY

United States Patent Office

Re. 26,524
Reissued Feb. 11, 1969

26,524
PULL TAB CAN OPENER

Fernando M. Ronci, Providence, R.I., assignor to American Can Company, New York, N.Y., a corporation of New Jersey Original No. 3,241,708, dated Mar. 22, 1966, Ser. No. 327,967, Dec. 4, 1963. Application for reissue Mar. 19, 1968, Ser. No. 717,055
U.S. Cl. 220—53 2 Claims
Int. Cl. B65d *17/20, 25/14, 17/02*

Matter enclosed in heavy brackets [ ] appears in the original patent but forms no part of this reissue specification; matter printed in italics indicates the additions made by reissue.

*ABSTRACT OF THE DISCLOSURE*

*A pull tab can opener which is easily opened without the use of an opening tool and yet which will expose no jagged edges to create a hazard to the user. The can end has an opening, the edges of which project downwardly to provide a sharp cutting surface, a plug having a pull tab positioned in the opening and a thin membrane bonded to the bottoms of the plug and can end so that when the pull tab is lifted, the membrane is torn at the cutting edge and the plug and the portion of the membrane bonded to it are detached from the end to open the can.*

My present invention relates to cans for dispensing liquids and more particularly to a novel construction of a pull tab opener for a can.

The principal object of the present invention is to provide a can closure which permits easy and rapid opening of the can by pulling a tab in the cover.

Another object of the present invention is to provide a pull tab construction made of a non-metallic material which will prevent injury to the hands or fingers.

A further object of the present invention is to provide a pull tab construction in which the disposable tab is made of a plastic material which will not harm children or grownups.

Another object of the present invention is to provide a pull tab construction which can be applied to different shapes of can openings.

A further object of the present invention is to provide a pull tab construction for a can which is simple in construction and easy and economical to manufacture and assemble.

With the above and other objects and advantageous features in view, my invention consists of a novel arrangement of parts, more fully disclosed in the detailed description following in conjunction with the accompanying drawings, and more particularly defined in the appended claims.

It has been found desirable to provide cans for dispensing liquid foods or similar articles with tear strip devices which permit the opening of the can without the use of can openers. Recently, beer cans have been equipped with tear strips or tabs mounted in the cover which are pulled away from the cover exposing an opening through which the liquid contents may be poured. Such tear strips are retained in the cover by partially cutting through a portion of the cover made of aluminum and providing a finger engageable tab which can be pulled to tear the portion of the cover away. In actual practice it has been found that the jagged sharp edges of the metal result in many cuts and injuries to the thumb and forefingers in use. As a result this construction is limited to beer cans and has not been used for cans holding soft drinks and similar items because of the danger to small children. Furthermore, the pull on the tab must be fairly sharp in order to tear the metal. This also precludes the can from being used on soft drinks for small children. The present invention is designed to eliminate these defects by providing a tear strip made of plastic material which will allow no jagged metallic edges and which permits easy removal of the strip. The tear strip of the present invention provides a disposable plastic tab which is harmless when either stepped on, grasped or otherwise handled so that even children can handle it without cutting their fingers. The tab of the present invention is therefore suitable not only for beer cans but for any other type of liquid dispenser even where children are involved. Furthermore, the device of the present invention can be applied to a can holding solid foods where it is necessary to remove the contents with a spoon.

Figure 1:
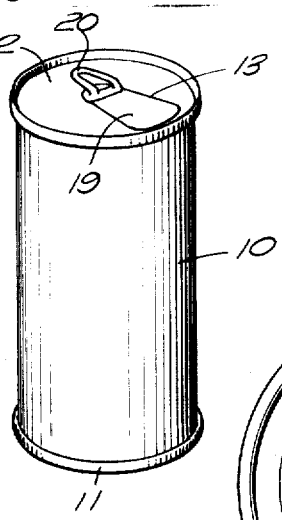
FIG. 1 is a perspective view of a can having a pull tab construction embodying the present invention.

Referring more in detail to the drawings, FIG. 1 illustrates a conventional can 10 having a bottom 11 and a top 12. These cans are usually supplied by the manufacturer with the bottom 11 rolled and locked into place as shown in FIG. 1 but with the top open and shipped separately. Normally, the can is filled with beer or any other item by automatic machinery, which then places the cover on the can and rolls the cover into sealing position with the same seal that the bottom is locked to the can with. This type of operation permits the cover to be supplied with any type of device such as spouts or tabs and also permits the cover to be made of any other material not necessarily the same as the body and bottom of the can. For example, it has been found that for rapid opening, the top of the can can be made of thin aluminum whereas the body of the can and the bottom are of sheet steel which has been galvanized or tin coated. In accordance with the present invention I provide a cover 12 which is equipped with a plastic pull tab for producing a quick opening in the cover or for producing a quick removal strip for opening the cover.

Figure 2:
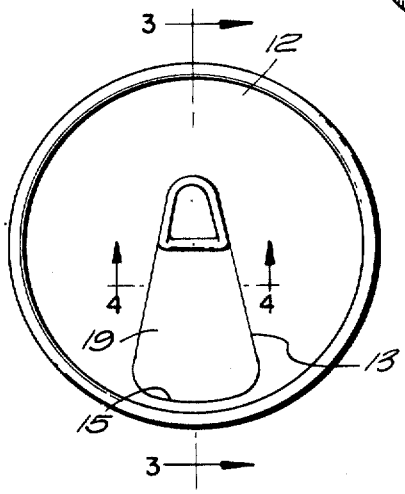
FIG. 2 is a top plan view of the can.
Figure 4:
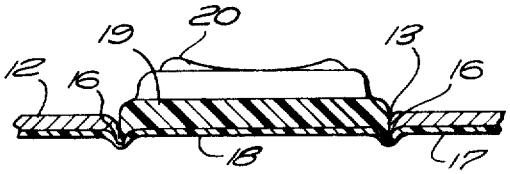
FIG. 4 is an enlarged section taken on line 4—4 on FIG. 2.
Figure 3:
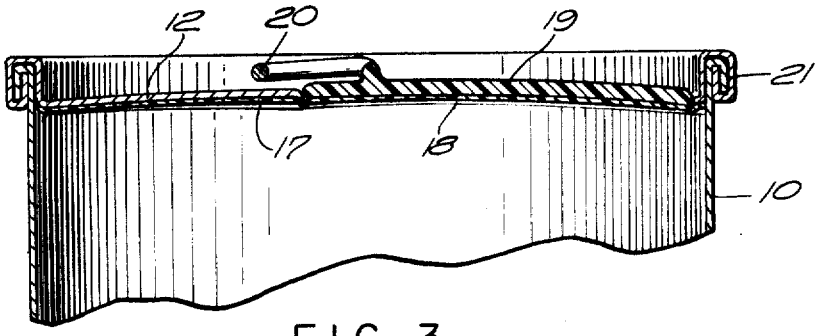
FIG. 3 is an enlarged section taken on line 3—3 on FIG. 2.

Referring to FIGS. 2, 3 and 4, the cover 12 is normally made of sheet metal or it may be of a stiff plastic or other similar material. For the purposes of the present invention I stamp an opening in the cover of any desired shape such as the opening 13 illustrated in FIGS. 1 and 2. In the illustrated form the inner end of the opening 13 is approximately in the center of the can and comprises a rounded inner end 14 with diverging sides extending to almost the edge of the cover to the end 15 running parallel to the edge of the cover. Now referring to FIG. 4, the opening 13 is cut to produce a sharp downwardly extending burr or edge 16. This is conventional in certain types of cutting tools and results in a downwardly extending jagged sharp edge 16, around the perimeter of the opening 13. In the manufacturing operation the cover portions 12 may be initially stamped from coil stock and at the time of stamping, the opening 13 may be simultaneously punched from the cover. I now provide the underside of the cover 12 with a thin layer 17 of a suitable plastic material such as polyethylene or any other suitable material which would be impervious to the contents of the can. The layer 17 may be bonded to the bottom of the can cover 12 by means of heat or by an adhesive. As can be seen in FIG. 4, the sheet of plastic material completely covers the entire surface of the cover 12 including the jagged edges 16 formed by the cut 13. In fact, the portion of the plastic material 17 extending between the jagged edges 16 forms a membrane 18 which completely covers and seals the opening 13.

I now provide a thickened plastic member 19 shaped to fit into the opening 13 and forming a plug for the opening 13. The member 19 is bonded to the membrane portion 18 of the plastic strip 17 as shown in FIG. 4. The member 19 can be bonded to the membrane 18 by heat, or by the use of an adhesive. If desired, the thickened portion formed by the member 19 in the opening 13 may be formed integrally with the thin strip 17. This would require thickened portions to be molded on the strip in spaced relation so that it will be formed in the correct position for each cover. At the top of each member 18 is an integral finger engageable loop 20 molded with it to lie flat as shown in FIG. 2 away from the opening 13 and against the cam cover 12. The cover 12 is now laid on top of the body of the cam 10 and the parts are locked or sealed together by means of the crimping action at the edge 21 with the plastic material 17 acting as a gasket at the seal 21 to further seal the cover into place.

In use, when it is desired to open the can and drink the contents, the user merely lifts the tab 20 and pulls upwardly thereon. Pressure of the plastic material in the member 19 upwardly will pull the membrane 18 against the jagged edges 16 of the cut and cause the piece of plastic material betwen the edges 16 to peel out away from the rest of the member 17 and pull out of the opening 13. The plastic will easily tear away and as soon as the first cut is made by the jagged edge 16 the entire piece of plastic material will pull out of the opening 13. Since the jagged edges around the opening face inwardly no exposed sharp metallic edges are provided. The tab 20 and its member 19 and the supporting under membrane 18 are all soft plastic material which are incapable of cutting the skin and are therefore not harmful whether stepped on or handled by children. The force required to remove the tab is less than that required in the metallic tabs now used. This means that the tab of the present invention can be used on soft drink cans which are to be opened by children. The device of the present invention thus lends itself to providing cans of beer or food or any other type of liquid which can be opened on the spot without the use of can openers and without the danger of cutting the skin.

Figure 5:
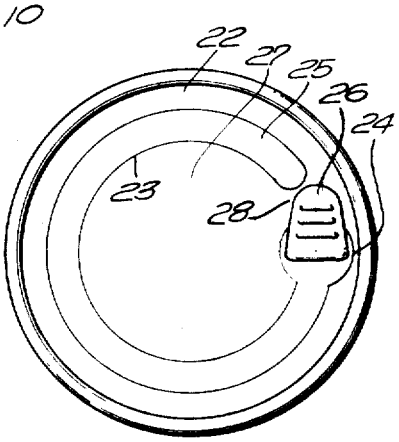
FIG. 5 is a top plan view similar to FIG. 2 showing another form of the invention.

It should be noted that the opening 13 is illustrated as of a certain size and shape for the purposes of the present invention. However, the opening can be any desired shape or size and may extend from one side of the can to the other if necessary. In the form illustrated in FIG. 5, the present invention is used in the form of a tear strip for exposing the cover of the can without the use of a key. In this form the cover 22 is provided with an elongated wide slot 23 extending adjacent the edge of the can cover 22 and partially around the cover terminating in an enlarged portion 24. A sheet of plastic material 25 is bonded to the bottom of the cover with the thickened portion entering the slot 23 as shown in FIG. 5. At the enlarged portion 24 a tab 26 is provided which is used to tear the strip 25 out of the cover. This leaves the central cover portion 27 supported at only a thin spot 28 so that it can be lifted upwardly and expose the contents of the can. This type of construction can be used where the can contains solid material which must be removed by a spoon.

Variations can thus be made in the size, shape and length of the strip. The basic idea being that a sheet of very thin material is bonded to the bottom of the cover covering the jagged edges around the openings and a thicker piece used to plug the opening. By pulling at the thicker piece the thin strip is torn across the jagged edges and results in the removal of a piece of pliable plastic material exposing the opening in the can. The thin strip can be plastic, metal foil or any other pliable material which will part easily without leaving a sharp edge. The various parts lend themselves to rapid and easy manufacture and assembly. Instead of the thick plastic, the metal punched from the cover can be put back and provided with a pull ring. Other advantages of the present invention will be readily apparent to a person skilled in the art.

I claim:

1. A can cover comprising a flat metallic member, an opening stamped from said member, a thin [plastic] membrane bonded to the bottom of said member and sealing said opening, and means for removing the portion of said membrane over said opening through the top of said member when said cover is locked in place on a container, the peripheral edge of said opening extending downwardly to form a sharp cutting edge against said membrane.

2. A can cover comprising a flat metallic member, an opening stamped from said member, a thin [plastic] membrane bonded to theb ottom of said member and sealing said opening, and means for removing the portion of said membrane over said opening through the top of said member when said cover is locked in place on a container, *said last named means comprising* [and] a thickened plug shaped to fit into said opening [on] *and bonded to* said membrane, said plug having a manually engageable tab, the peripheral edge of said opening extending downwardly to [for] *form* a sharp cutting edge against said membrane.

References Cited

The following references, cited by the Examiner, are of record in the patented file of this patent or the original patent.

UNITED STATES PATENTS

| | | | |
|---|---|---|---|
| 2,777,601 | 1/1957 | Cheeley | 229—51 |
| 2,870,935 | 1/1959 | Houghtelling | 220—53 |
| 3,151,766 | 10/1964 | Henchert | 220—54 |

GEORGE T. HALL, *Primary Examiner.*